March 17, 1936.  A. G. SAXE  2,034,446
MANIKIN
Filed July 29, 1932   4 Sheets-Sheet 1
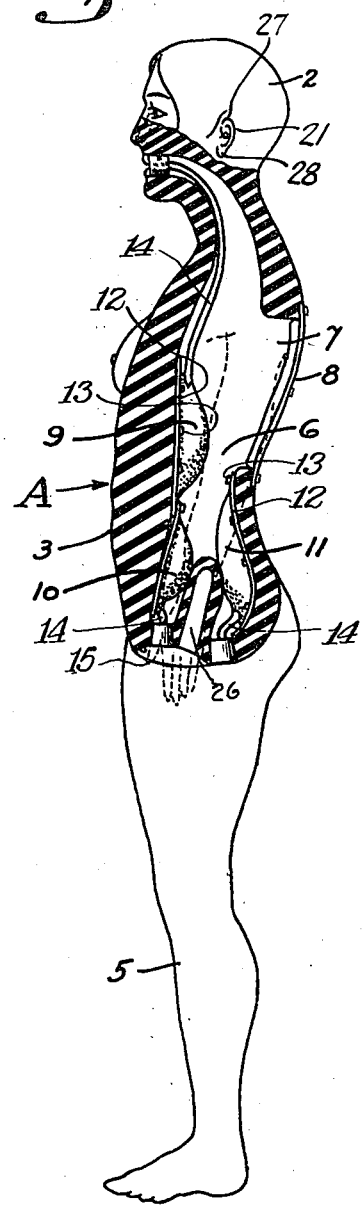
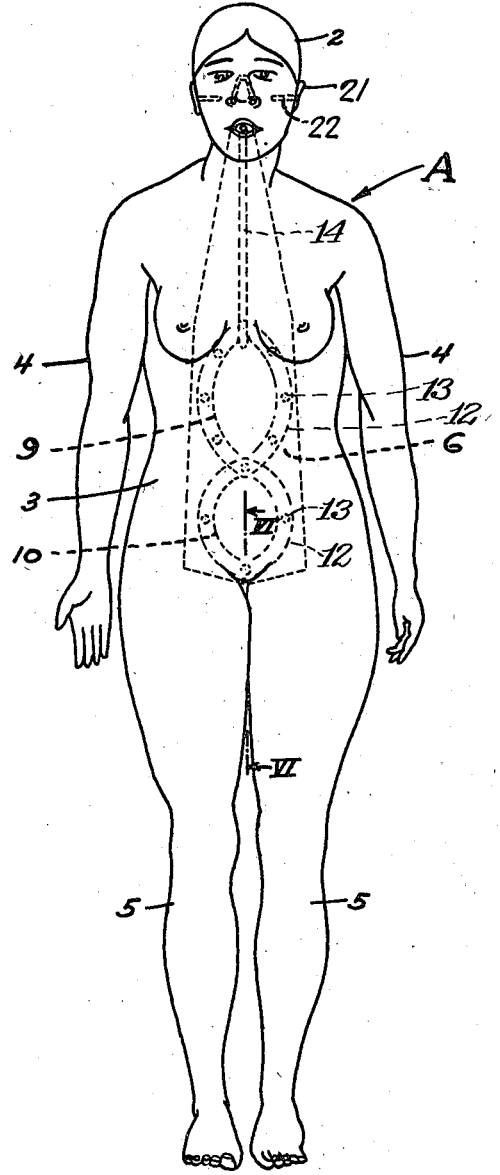
INVENTOR.
Arthur G. Saxe
BY
Townsend and Loftus
ATTORNEYS.

March 17, 1936.  A. G. SAXE  2,034,446
MANIKIN
Filed July 29, 1932  4 Sheets-Sheet 2

INVENTOR.
Arthur G. Saxe.
BY Townsend and Loftus.
ATTORNEYS.

March 17, 1936.  A. G. SAXE  2,034,446
MANIKIN
Filed July 29, 1932  4 Sheets-Sheet 4

INVENTOR.
Arthur G. Saxe.
BY Townsend and Loftus.
ATTORNEYS.

Patented Mar. 17, 1936

2,034,446

UNITED STATES PATENT OFFICE 2,034,446

MANIKIN

Arthur G. Saxe, San Francisco, Calif., assignor of one-third to Arthur E. Lock and one-third to Eleanor S. Clarke, both of San Francisco, Calif.

Application July 29, 1932, Serial No. 625,601

6 Claims. (Cl. 35—17)

This invention relates to a manikin or model of the human female body, especially constructed for the purpose of teaching certain nursing and medical procedures.

In most hospitals and similar institutions there is always a considerable number of student nurses who are taking courses in nursing and certain medical procedures. Each nurse is provided with a nursing instruction book, which is studied, and practical demonstrations and instructions are given in conjunction therewith.

The student nurses are given instruction in nursing and medical procedures in the treatment of the different organs of the body, for instance, the nose, ears, mouth, vesical (urinary) bladder, vagina, rectum, etc. Instructions are given in bathing, bandaging, applications of compresses, etc., and the nurses are also taught how to move a patient to or from a bed or gurney, the making of the bed, changing of bed linen and various equipment.

The written or printed instructions can be read or studied by the individual nurses during study periods or otherwise, but practical demonstrations, instructions and other procedures require group attendance of the student nurses, and it also requires a patient or a volunteer upon whom the demonstrations can be performed. Patients or volunteers are difficult to obtain, particularly for certain demonstrations, as most individuals object to being practiced on or being exposed before groups of individuals. Hence, practical procedure and instruction are considerably hampered.

The object of the present invention is to provide a manikin or model of the human female body whereby nursing and medical procedures may be practically demonstrated and taught; to provide a manikin having cavities, passages and containers formed therein, not in imitation of the human organs but only to permit practical demonstrations and teaching of certain nursing and medical procedures; and further, to provide a manikin of the character described in which the containers and other devices employed may be readily removed for filling, inspection, repair, or otherwise.

The manikin is shown by way of illustration in the accompanying drawings, in which Fig. 1 is a side elevation partially in section.
Fig. 2 is a front view of a manikin.
Fig. 3 is a rear view of the manikin.
Figs. 4 and 5 are detail views showing the manner in which the nasal passages are formed in the manikin.

Figure 3:
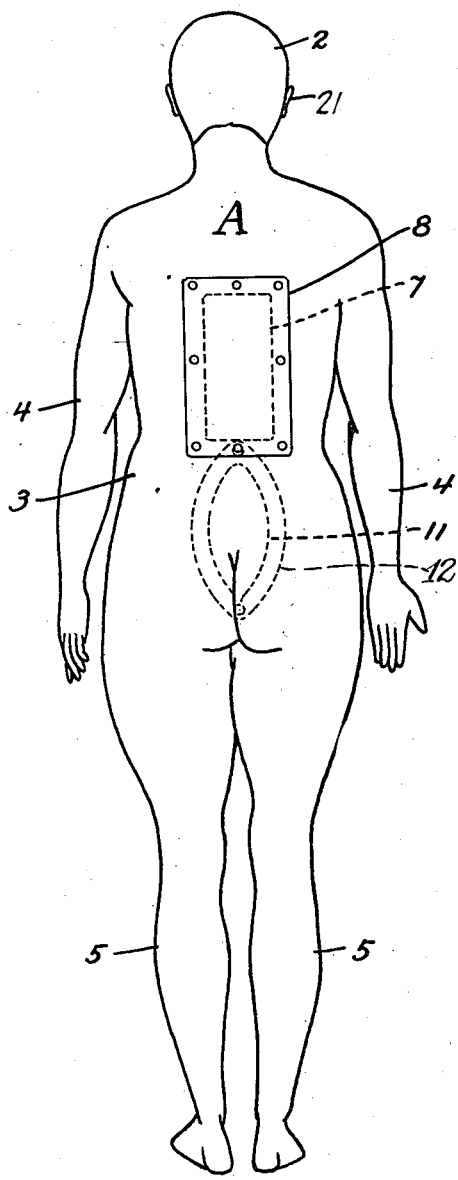

Referring to the drawings in detail, and particularly to Figs. 1 and 2, A indicates in general a manikin or a model of the human female body made of sponge rubber or any other suitable material. The manikin is provided with a head portion 2, a body or trunk 3, arms 4, and legs 5. The manikin is modeled to a shape to conform to the actual human female body as closely as possible. The head is provided with a series of cavities or passages representing the nasal passages, the ear passages, and the mouth.

Figure 4:
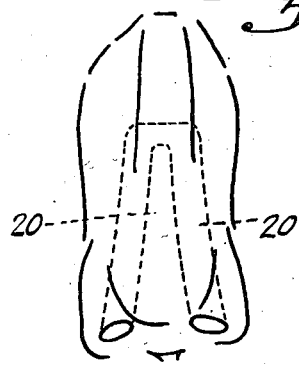
Figure 5:
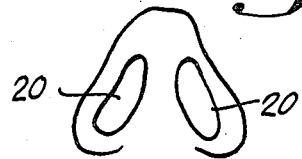
Figure 6:
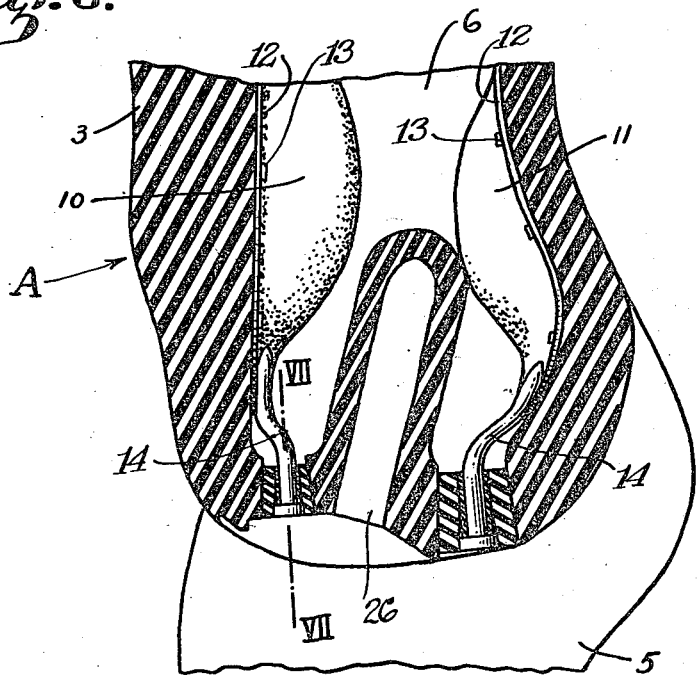
Fig. 6 is a vertical sectional view taken on the lines VI—VI of Fig. 2, showing the manner in which the lower passages of the trunk portion of the body are formed.
Figure 7:
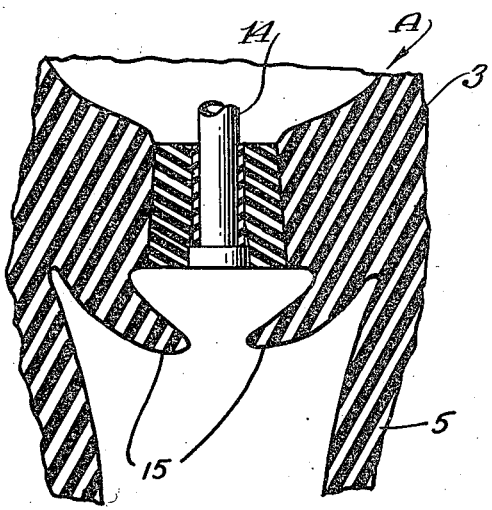
Fig. 7 is a horizontal section of the urethra taken on the line VII—VII of Fig. 6.

To simulate the passages of the human nose, two tubes 20 are molded or otherwise formed in the nose approximately ⅜ inch in diameter and 1¼ inches long. These tubes are connected at their base, as shown in Fig. 4, and permit insertion of nozzles, tubes or other implements such as required for practical demonstrations and instructions.

The ears 21 on the head are molded to resemble an ear as closely as possible, and each ear contains a tube 22 ¼ inch in diameter and 1 inch deep. The upper and lower flaps of the ear, or in other words, the auricle 27, and the lower lobe 28 of the ear will be positioned and attached to the head as in the normal human. This will permit the teaching of the student nurses to use one hand to put tension in one direction for an adult and another for a child, as is common practice, in order to straighten the ear canal while applying, for instance, an irrigating tube with the other hand. The above also permits the teaching of the student nurse the volume of the particular type of cotton packing designed for ear use and the placement thereof. It also permits the teaching of other treatment in conjunction with the ears, for instance, that of irrigation and so on.

Figure 8:
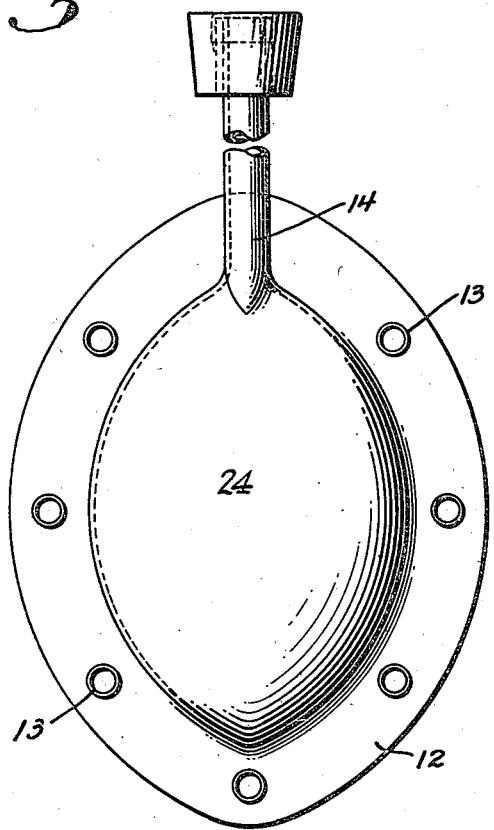
Fig. 8 is a front view of one of the removable containers placed within the manikin.
Figure 9:
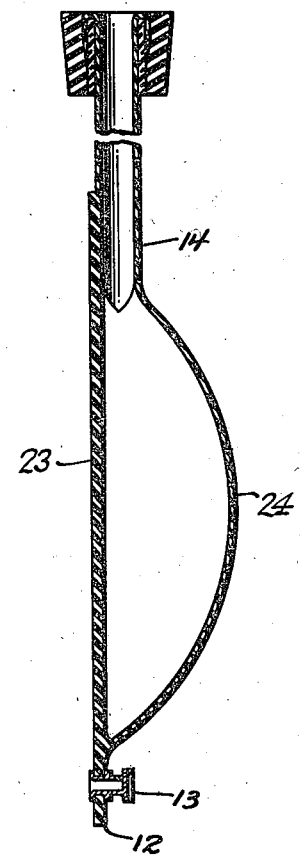
Fig. 9 is a central vertical section of the same.

Formed within the body, as shown in Fig. 1, is a large chamber 6 in which are placed a number of containers such as shown at 9, 10, and 11, the container 9 representing the stomach, the container 10 the bladder, and the container 11 the colon or intestinal tract. The three containers are substantially identical in construction but will have different capacities. The manner in which they are constructed is clearly illustrated in Figs. 8 and 9. Each container consists of a rubber bag or the like having a back portion 23 and a front portion 24 joined by a surrounding annular flap 12 whereby it may be fastened to the inner walls of the chamber 6 by any suitable type of snap buttons, a portion of one type of such a button being shown at 13. Each bag is provided with a neck 14 to which tubes hereinafter to be described may be attached.

The stomach, as previously stated, is represented by the container 9. Leading from the natural position of the mouth will be a rubber tube 14 ½ inch in diameter, the upper end of the tube communicating with the mouth and the lower end being suitably connected to the container 9. This container will have a capacity of substantially 1,000 c. c. and the half-inch tubing will have an entire length of approximately 24 inches.

The student nurse is taught three procedures, that of stomach lavage, gavage, and test meals. The first is a cleansing procedure, the second feeding, and the third is for the purpose of obtaining stomach contents for laboratory anaylsis. There is also another procedure called Connell Suction which may be used either for lavage or gavage. The printed instruction books or sheets given the nurses are very explicit as to the procedures, and as the tubal throat and stomach of the manikin are definitely measured to approximate the human, it facilitates instruction as to the proper depth of insertion of the tubes. The container 9 being approximately human size enables it to be filled with a proper amount of liquid in order that the student may withdraw stomach contents specimens of specified quantities and at specified times in accordance with the particular test meal procedure under instruction.

The vesical (urinary) bladder, as previously stated, is indicated at 10. It is buttoned or otherwise secured to the frontal cavity of the manikin and will have a capacity of substantially 500 c. c. This container is connected to a rubber tube 3 inches long and ¼ inch in diameter, ending at the outside of the manikin at the natural position of the female urethra. Approximately midway of the tube a portion of which is shown at 10ª in Fig. 10 about 1½ inches from the external opening of the urethra will be a rubber valve, such as shown at 10ᵇ, this valve being designed to retain any liquid in the container and also to simulate the natural sphincter muscle for the retention of urine, and also to simulate the natural resistance that would be experienced in inserting a catheter.

The usual procedures taught the student nurses are catheterization and bladder irrigation, and are fully outlined in the printed instructions given the nurses. In the natural position on either side of the meatus and partly covering it will be molded rubber flaps 15 resembling the labia. The natural position and size of the labia in conjunction with the meatus and its connecting urethra forces the student to use her hands in the correct manner as outlined by the teaching procedure.

Just below the opening of the urethra there is molded a second cavity or opening 26 to represent the vagina. This cavity will be approximately 1 inch in diameter and 6 inches deep. The procedure taught the student nurse is irrigation, etc., the detail instructions being given in the printed matter with which the nurses are supplied.

Figure 10:
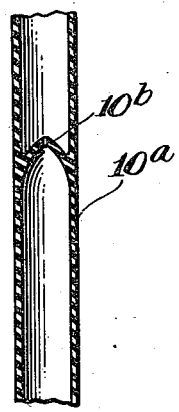
Fig. 10 is a detail sectional view of one of the tubes leading to a container.

*Rectum.*—Buttoned or otherwise secured to the rear cavity or the chamber 6, is the container 11. This has a capacity of approximately 1,000 c. c. and it is connected through a rubber tube ½ inch in diameter and approximately 3 inches long with the outside of the manikin at the position of the anus. About 1¼ inches from the external opening of the tube will be placed a valve such as shown in Fig. 10. This is placed to retain the fluids in the container 11 and also to simulate the sphincter muscle naturally at the position of the anus.

The procedures taught the student are that of enemata, colon irrigations, proctoclysis, the various procedures being fully taught in the printed instructions, but the practical operations being taught by means of the manikin. The container 11 is not in imitation of the colon or intestines, but merely represents a reservoir having a capacity sufficient for the technique to be taught.

From the foregoing, it will be clear that the manikin is in no manner an anatomical model, as the containers placed therein are for mechanical purposes only and do not resemble the organs in conjunction with which they are used. The manikin, together with these reservoirs or containers and the tubes connected therewith, however, serves the purpose of teaching and giving practical instructions for various nursing and medical procedures.

The manikin may similarly be used for teaching bathing, bandaging, application of compresses, etc. The manikin may also be placed in a bed so that the nurses may be taught the manner of moving the patient to or from a bed or gurney, making of a bed, changing of bed linen and various equipment. The manikin may also be employed for teaching different positions a patient may be placed in when given various treatments. For this purpose socket joints may be provided at the hips and shoulders and other joints at the knees, ankles, and other movable parts.

The head, the trunk and limbs are preferably constructed of sponge rubber or the like or may be made of any other suitable material, and should preferably be coated with smooth rubber so that the manikin may be readily cleaned or used for bathing instructions, etc.

While certain features of my invention have been more or less specifically described, I wish it understood that various changes may be resorted to within the scope of the appended claims; similarly, that the materials and finish of the several parts employed may be such as the manufacturer may dictate or varying conditions may demand.

Having thus described my invention, what I claim and desire to secure by Letters Patent is—

1. A device for use in the instruction of nurses which comprises a manikin made in likeness to the human figure and having an interior compartment formed therein, a container adapted to be secured within the compartment, a tubular member on the container adapted to extend through an orifice formed in the manikin, and a valve in said tube functioning in the manner of a sphincter valve.

2. A device for use in the instruction of nurses which comprises a manikin made in likeness to the human figure and having an interior compartment formed therein, a container adapted to be secured within the compartment, a tubular member on the container adapted to extend through an orifice formed in the manikin, and an automatically and normally closed constriction formed in the tubular member but yieldable to open to permit a tube to be passed through the constriction, said constriction simulating and functioning as a sphincter muscle.

3. A device for use in representing an internal organ of a minikin which comprises a container, a tubular passage forming communication between the interior of the container and a body opening normally connecting with said organ in the human body, and means in said tubular passage normally preventing fluid flow therethrough and capable of being opened in the manner of a sphincter muscle by insertion of a tube.

4. A container for use in a manikin, which comprises a rubber vessel, means for securing the vessel to an inner wall of the manikin, a tube connecting the passage with an opening representing a body opening, and valve means in said tube normally preventing fluid flow therethrough, said valve means being yieldable to open in the manner of the sphincter muscle.

5. A container for use in a manikin, which comprises a rubber vessel, means for securing the vessel to an inner wall of the manikin, a tube connecting the passage with an opening representing a body opening, and a rubber plug fitted in the body opening and receiving the end of the tube to support the same at said opening.

6. In a manikin to be used in instructing nurses, which comprises a body member made in likeness to the human figure and having a chamber formed therein, a container for liquid in said chamber, a tube connecting the container with an opening formed in the manikin to represent a natural body opening, and means in said tube for permitting a smaller tube to be passed therethrough and preventing the passage of liquid therethrough when the smaller tube is removed.

ARTHUR G. SAXE.